US007117367B2

(12) United States Patent
Carro

(10) Patent No.: US 7,117,367 B2
(45) Date of Patent: Oct. 3, 2006

(54) METHOD OF AUTHENTICATING A PLURALITY OF FILES LINKED TO A TEXT DOCUMENT

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 10/479,892

(22) PCT Filed: Jun. 4, 2002

(86) PCT No.: PCT/EP02/06928

§ 371 (c)(1),
(2), (4) Date: Dec. 1, 2003

(87) PCT Pub. No.: WO02/101522

PCT Pub. Date: Dec. 19, 2002

(65) Prior Publication Data

US 2004/0153452 A1  Aug. 5, 2004

(30) Foreign Application Priority Data

Jun. 12, 2001  (EP)  ................................. 01480047

(51) Int. Cl.
    *H04L 9/00* (2006.01)
(52) U.S. Cl. ..................... 713/176; 713/180; 380/28
(58) Field of Classification Search ................ 713/176, 713/180
    See application file for complete search history.

(56) References Cited

U.S. PATENT DOCUMENTS 5,499,294 A   3/1996  Friedman ..................... 380/10
5,629,770 A   5/1997  Brassil et al. ............. 358/261.1
5,915,024 A * 6/1999  Kitaori et al. ............... 713/176
5,958,051 A   9/1999  Renaud et al. .............. 713/200

(Continued)

FOREIGN PATENT DOCUMENTS

WO    WO 97/14087    4/1997

(Continued)

OTHER PUBLICATIONS

Bender et al. "Techniques for Data Hiding," *IBM Systems Journal*, vol. 35, Nos. 3-4, 1996 pp. 313-335, No publication month & date. Accepted for publication on Feb. 29, 1996.

(Continued)

*Primary Examiner*—David V. Bruce
*Assistant Examiner*—April Shan
(74) *Attorney, Agent, or Firm*—Schmeiser, Olsen & Watts; William H. Steinberg

(57) ABSTRACT

A method of authenticating a text document with links to a plurality of files by modifying at least a selected attribute of invisible characters on a plurality of inter-word intervals of the text document, this method comprising the steps of computing (step 10) a one-way hash function of each file in order to obtain a hash value composed of a subset of hash digits for each one, encoding (step 16) each subset of a plurality of subsets of space characters in the document by replacing in each subset of space characters, the value of the selected attribute for each space character by a corresponding encoded hash digit of each subset of hash digits corresponding to each file, computing (step 18) the electronic signature of the encoded text document by using a public-key algorithm composed of a subset of signature digits, and encoding (step 20) another subset of space characters in the encoded document by replacing the value of the selected attribute for each space character by a corresponding encoded signature digit.

15 Claims, 5 Drawing Sheets

U.S. PATENT DOCUMENTS 6,772,342 B1 * 8/2004 Hawthorne ................ 713/176
2002/0013794 A1 * 1/2002 Carro et al. ................ 707/534

FOREIGN PATENT DOCUMENTS

WO    WO 00/77677 A2    6/2000

OTHER PUBLICATIONS

Brassil et al "Electronic Marking and Identification Techniques to Discourage Document Copying," *IEEE Journal on Selected Areas in Communications,* vol. 13, No. 8, October 1995, pp. 1495-1503.
Dittman et al., "H2O4M—Watermarking for Media: Classification, Quality Evaluation, Design Improvements," *Proceedings of the 2000 ACM Workshops on Multimedia.* pp. 107-110, Nov. 2000.
Kohl et al. "Security for the Digital Library-Protecting Documents Rather than Channels," *Database and Expert Systems Applications.* Aug. 26-28, 1998, pp. 316-321.
Krawczyk et al. "HMAC: Keyed-Hashing for Message Authentication," Feb. 1997, pp. 1-11.
Lacy et al. "Music on the Internet and the Intellectual Property Protection Program," *ISIE '97,* Jul. 7, 1997.
"Secure Hash Standard," Federal Information Processing Standards Publication 180-1. Apr. 17, 1995, pp. 1-18.
Su et al. "Digital Watermarking of Text, Image, and Video Documents," *Computers and Graphics, Pergamon Press, Ltd.* vol. 22, No. 6, Dec. 1998.
International Search Report dated Jun. 25, 2003 for corresponding PCT application No. PCT/EP02/06928.

* cited by examiner

METHOD OF AUTHENTICATING A PLURALITY OF FILES LINKED TO A TEXT DOCUMENT

Related Application

This application is a national stage application of PCT/EP02/006928, filed Jun. 4, 2002, and claims priority from European Application No. 01480047.8, filed Jun. 12, 2001. These disclosures are hereby incorporated by reference herein in their entireties. The above PCT International Application was published in the English language and has international Publication No. WO 02/101 522 A2.

TECHNICAL FIELD

The present invention relates to the methods of embedding the integrity information of a text document and of the files which are linked thereto in an invisible manner, and relates in particular to an improved method of authenticating the text document and the linked files.

BACKGROUND

With the increasing use of open networked environments, such as the Internet, the demand for more secure systems for transferring shared information among networked computers has correspondingly increased. Today, the most serious risk associated to electronic information exchange on open, unsecured, networks, particularly on the Internet, is that digital data may be much more easily modified than ever before.

Most of today's transactions on the Internet, involve the access by the user to files on Web servers or mail servers directly from textual documents. On those open, unsecured networks, when a user selects and triggers an hyperlink on a Web page from a Web browser, or when a user clicks on the icon of a file attached to a received e-mail, it is becoming of the out most importance to authenticate the received data files prior to using them as intended. Such data files may include, but are not limited to, computer programs, text, graphics, pictures, audio, video, or other information that is suitable for use within a computer system.

By way of example of those security concerns, if an e-mail includes an attachment to an executable file or software program, the user may wish to be sure that it has been sent by a trustworthy party prior to exposing his computer system to a program file that might include a "Trojan Horse" or that could infect the user's computer with a virus. Thus, when a user on the Internet receives data from a server or from another user, it may be necessary for the receiving user to verify that the data received has not been corrupted or otherwise altered in some manner. Furthermore, the receiving user may need to verify that the data received was actually sent by the proper sending user rather than by an impostor.

To improve the security of data transmitted over computer networks while preventing for digital forgeries and impersonations, document authentication and signer authentication safeguards are being utilized.

Nowadays, digital signatures are the main cryptographic tools employed to provide document and signer authentication and integrity verification. Digital signatures are basically mechanisms through which users may authenticate the source of a received data file. Digital signatures achieve these results through cryptographic-key based algorithms, the security in these algorithms being based on the key (or keys), not in the details of the algorithm. In fact, the algorithms may be freely published and analyzed.

There are two general types of key based authentication algorithms well known in the art: symmetric and public-key. On symmetric algorithms the encryption key and the decryption key are the same and must be kept in secrecy by both parties, the sender and the receiver. On public-key algorithms digital signatures are derived through the use of "public keys". Public key algorithms, also called asymmetric algorithms, are designed for using two different keys, so that one key, used for signing, is different from the second key, used for verification. Those algorithms are called "public-key" algorithms because the verification key can be made public. In contrast, the signature key needs to be kept secret by its owner, the signer. By the properties of cryptographic digital signatures there is no way to extract someone's digital signature from one document and attach it to another, nor is it possible to alter a signed message in any way without the change being detected. The slightest change in the signed document will cause the digital signature verification process to fail. Furthermore, the signing key cannot, in any reasonable amount of time, be calculated from the verification key.

Thus, using digital signatures involves two processes, one performed by the signer, which is the generation of the digital signature, and the other by the receiver of the digital signature, which is the verification of the signature. The signer creates a digital signature for the document by using his private signing key, and transmits both, the document and the digital signature to the receiver. Verification is the process of checking the digital signature by reference to the received signed document and the public verification key.

In practical implementations, public-key algorithms are often too inefficient to digitally sign long documents. To save time, digital signature protocols (i.e., RSA, DSA) are often implemented with secure (one-way) hash functions. Basically, instead of signing a complete document, the signer computes a hash-value of the document and signs the computed hash. Many signature algorithms use one-way hash functions as internal building blocks.

A hash function is a function that maps a variable-length input string (i.e. a document) and converts it to a fixed-length output string, usually smaller, called a hash-value. The hash-value serves as a compact representative image of the input string. Computing a one-way hash function usually does not require a key. As such, when the document is received, the hash function may be used to verify that none of the data within the document has been altered since the generation of the hash function. Thus, hash functions are typically limited in that the user may not necessarily infer anything about the associated data file, such as who sent it. In order to preserve the non-repudiation and unforgeability properties of digital signatures, when used in conjunction with a hash function, the hash function needs to be collision resistant. That is, it must be computationally unfeasible to find two messages for which the hash maps to the same value.

For authenticating a document that includes a plurality of attachments or links to other files, not only the document, but all the files that are linked to it must be authenticated. To deal with those very frequent cases, typically a single digital signature is generated by applying the digital signature algorithm to an aggregate of the document and all the files attached. When such signed document and attached files are received, the verification algorithm must be also applied to the same aggregate of the received document and attached files.

Now, the process of signing and verifying, and/or generating hash functions places an additional overhead on sending and receiving computational resources. Particularly, when a user receives a document that contains many attachments to large files, the verification of the aggregate of the received document and all attached files would imply a tremendous burden on the receiving computer resources and unacceptable delays on such a computer network environment.

In the prior art, there are methods for efficiently securing and verifying the authenticity of a plurality of data files, such as data files intended to be transferred over computer networks. Those methods for verifying the authenticity of groups of data files involve providing, along with the group of data files, a separate signature file which includes individual check-values for all data files (e.g., hash-values) as well as a digital signature for the group. The digital signature of the group of files is then verified using a computer system, and check-values in the signature file are compared with the corresponding values computed from the data files using the computer system. This class of methods that generate a separate signature file for groups of data files is represented by the approach described in U.S. Pat. No. 5,958,051.

Obviously, all those methods that assume the addition of checking information to a separate file have the drawback of indeed separating checked and checking information (i.e., the signature file). Thus, the latter can easily be isolated and removed intentionally, in an attempt to cheat, or accidentally just because the intermediate pieces of equipment or the communication protocols in charge of forwarding electronic documents and data files are not devised to manipulate this extra piece of information. Then, when authenticating a document having file attachments or links to other files, the checking information of the document and all attached files should rather be encoded transparently into the body of the document itself (i.e., in a manner that does not affect document's text format and readability whatsoever), so that it would remain intact across the various manipulations it is exposed to on its way to destination still enabling the end-recipient to verify the authenticity and integrity of the received document and the attached or linked files.

SUMMARY OF THE INVENTION

Accordingly, the main object of the invention is to achieve a method of authenticating a text document and the files linked thereto so that the integrity of the document and that all linked files could be checked individually, while preventing the integrity information from being separated or lost thus destroying the integrity of the document and the linked files.

The invention relates therefore to a method of authenticating a text document with links to a plurality of files by modifying at least a selected attribute of invisible characters on a plurality of inter-word intervals of the text document, this method comprising the steps of:

a) computing a one-way hash function of each file in order to obtain a hash value composed of a subset of hash digits for each one, b) encoding each subset of a plurality of subsets of space characters in the text document by replacing in each subset of space characters, the value of the selected attribute for each space character by a corresponding encoded hash digit of each subset of hash digits corresponding to each file, c) computing the electronic signature of the encoded text document by using a public-key algorithm composed of a subset of signature digits, and d) encoding another subset of space characters in the encoded text document by replacing the value of the selected attribute for each space character by a corresponding encoded signature digit.

According to a preferred embodiment of the invention, the steps of encoding includes the steps of transforming the text document into canonical form by setting on all inter-word intervals of the document the value of the selected attribute to the same default value, and for each file, encoding the hash digits of the hash value corresponding to the file as an ordered subset of values corresponding to the different values of the selected attribute, selecting a plurality of inter-word intervals among all inter-word intervals of the text document corresponding to a subset of space characters to be used for embedding the hash value into the text document, and replacing on each space character of the subset of space characters, the default attribute value of this space character by the corresponding encoded hash digit.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1A:
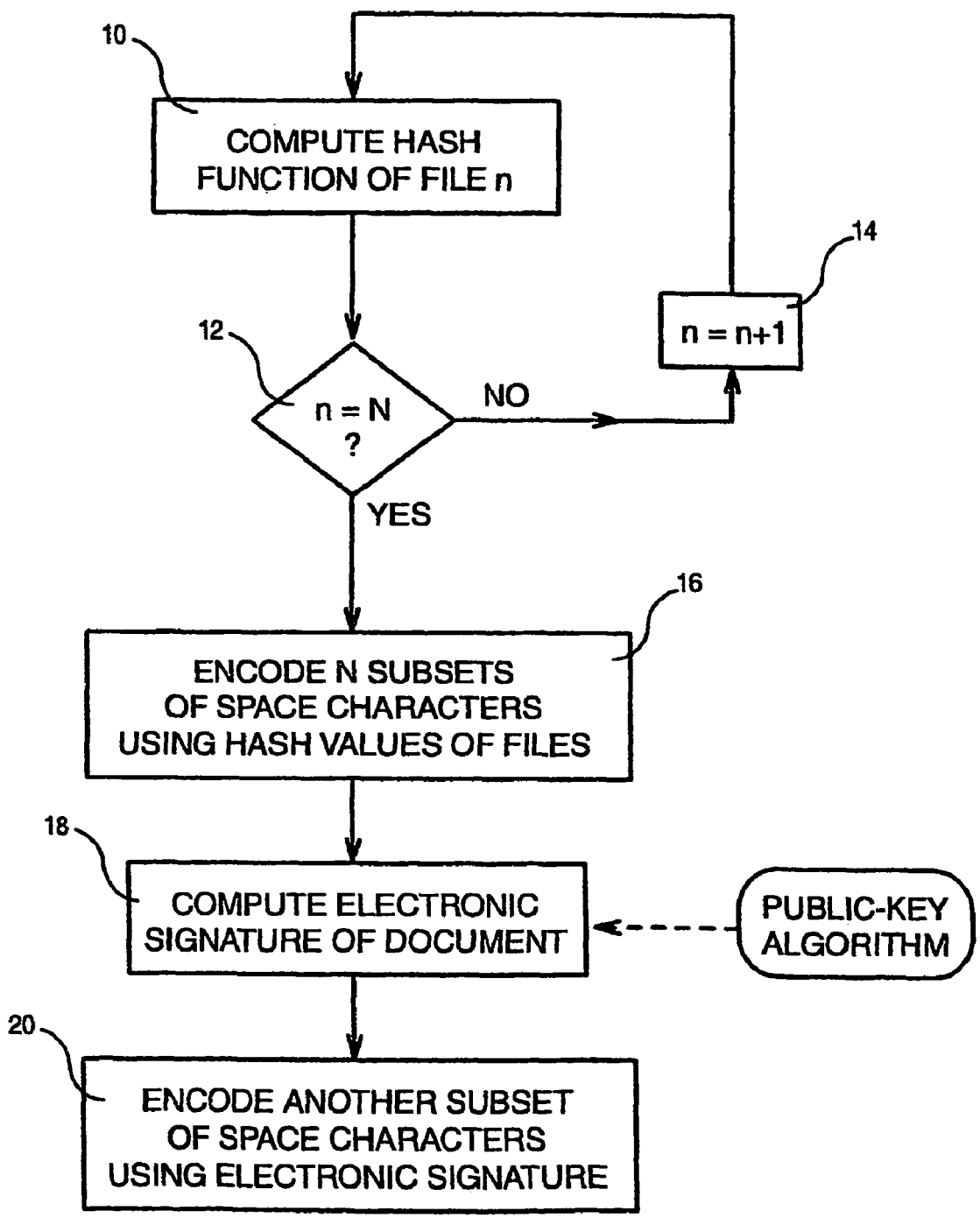
FIG. 1A is a flow chart representing the steps of the method according to the invention for authenticating a text document with links to a plurality of files.

It is assumed that an e-mail text document with links to a plurality N of files is to be authenticated before being sent over the Internet network. Referring to FIG. 1, by means of a one-way hash function (e.g. MD5), the authentication program computes the hash function of all the files. For this, the hash function of file n (with n=1 to N) is computed (step 10), a test is made to check whether n=N (step 12) and n is incremented by one (step 14) if n has not reached N.

When the hash function of all files has been computed, N subsets of space characters respectively associated with the N files are encoded (step 16) using hash values resulting from the hash function computing. Such encoding starts from the first inter-word interval of the document and a blank space is left for separating the encoded hash digits of two consecutive files.

It must be noted that the encoded document appears identical to the original document. In fact, when displaying and when printing, there is not any visually noticeable differences between them. Nevertheless, the input document and the encoded document are different. Using the action bar of wordPro for selecting "Text Properties", and moving the cursor over the blanks of the input document, the encoded sequence of space character attributes which corresponds to the hash values of the files can be seen.

Then, by means of a public-key algorithm, using the private key, the authentication program computes the electronic signature of the already encoded document (step 18). Starting from the position of the last encoded hash value and leaving one blank space for separating the last groups of encoded hash digits, another subset of space characters is encoded by using the digits of the electronic signature (step 20).

It must be noted that the authenticated document is also identical to the original document. In other words, when displayed or printed, there are not visually noticeable differences between them. However, moving the cursor over the blanks when "Text Properties" of WordPro has been selected, the encoded sequence of attributes that corresponds to the hash values of the files and to the electronic signature can be seen.

Note that an alternative of the above method may be used. Instead of computing the hash function of all the files before encoding subset of characters with the hash value, the hash function of a file is computed (step 22), just before encoding a subset of space characters by using the hash value resulting from the hash function (step 24). Then, it is checked whether n=N (step 26) and n is incremented by one if it is not the case (step 28). Finally, the steps of computing the electronic signature of the document (step 18) and of encoding another subset of space characters using the electronic signature (step 20) are the same ones as in the preceding embodiment.

The method of encoding a subset of space characters (steps 16 and 20 in FIG. 1A or steps 24 and 20 in FIG. 1B) is based upon modifying invisible parameters of the inter-word or space characters of a text without affecting the format and the visual appearance of the original text. Such parameters correspond to character attributes including the font type, text color, italic, bold or protected attributes of the space characters or any combination thereof.

Assuming that the color attributes of the space characters are selected, a mapping table between such color attributes and the digits of the hash value may be as follows.

| ENCODED VALUE | COLOR ATTRIBUTE |
|---|---|
| 1 | GRAY |
| 2 | DARK GRAY |
| 3 | RED |
| 4 | DARK RED |
| 5 | YELLOW |
| 6 | DARK YELLOW |
| 7 | GREEN |
| 8 | DARK GREEN |
| 9 | CYAN |
| 0 | DARK CYAN |
| NONE | BLACK |

Note that the color attribute could be combined with another attribute such as italic. The selection of the couple formed by text color and italic will enable to have as many different choices as the number of combinations of colors in the palette of colors and italic/non italic.

Figure 2A:
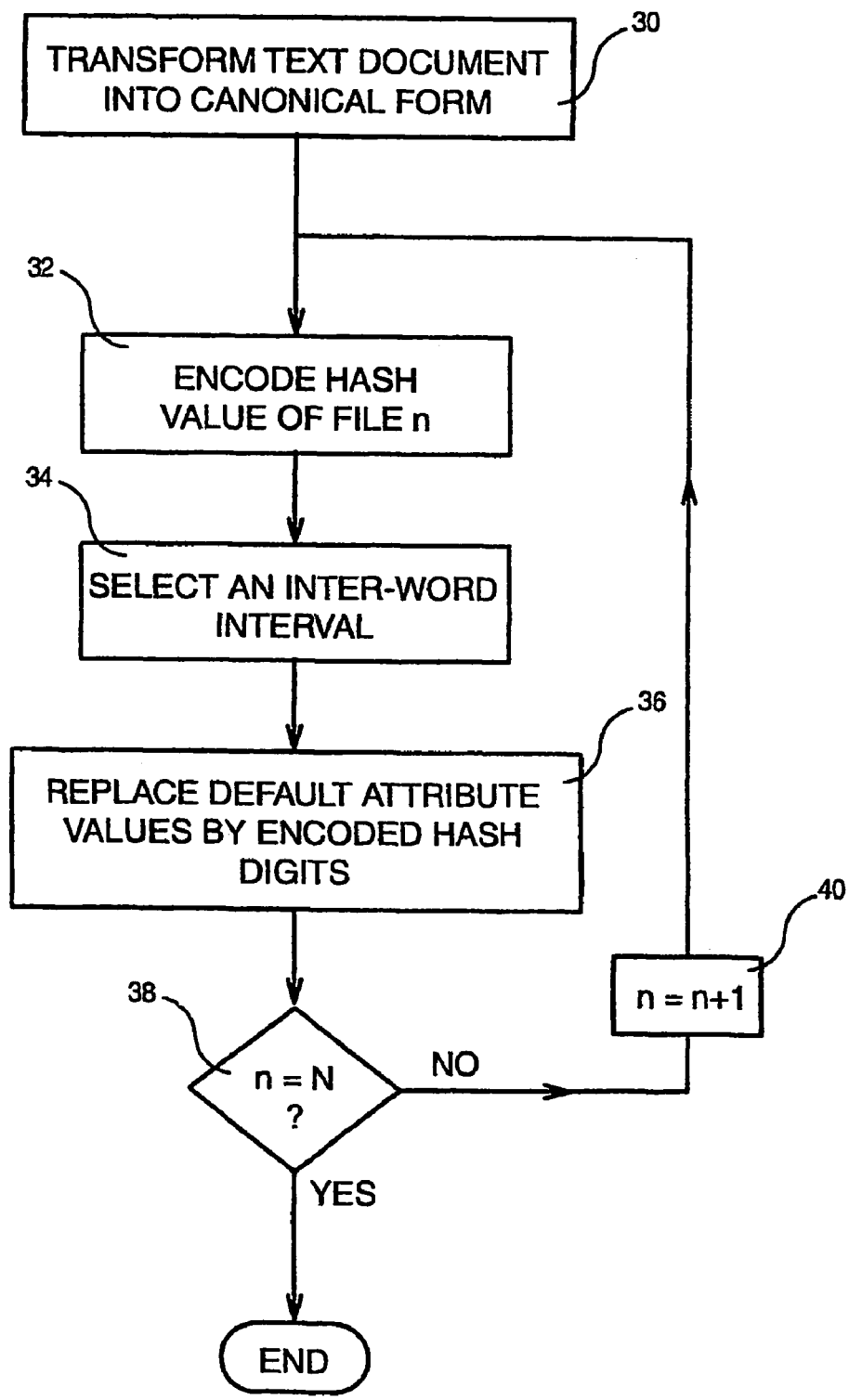
FIG. 2A is a flow chart representing the different steps used in the step of encoding subsets of space characters within the method illustrated in FIG. 1A.

The method of encoding is illustrated in FIG. 2A. First, the text document where the data is to be embedded is transformed into canonical form (step 30) by setting on all spaces of the text at least one of the selected attributes to the same default value. Thus, with the selection of the color attribute, this one is set to the (default) BLACK color for all space characters. In such a case, all space characters have by default the WHITE attribute for the background color. Note that setting a default value on any space character means that no information has been encoded on this space. The hash value of each file n (n from 1 to N) is then encoded (step 32) by using the set of encoded attribute values in the above table to obtain an ordered sequence of attribute values.

After having selected an inter-word interval among the inter-word intervals of the document to be used for encoding (step 34), such an interval being not already used, the default values of the attributes are replaced by the corresponding encoded attribute values of the ordered set of encoded attribute values for each space character of the selected subset of space characters (step 36). Note that the best way is to select consecutive intervals from the beginning of the document.

A test is then made to check whether the processed file is the last one, that is whether n=N (step 38). If not, n is incremented by one (step 40) and all the above steps are repeated except the step of transforming the text document into canonical form. The process is ended when the hash value of the last file has been embedded into the document.

In the above example wherein the selected attribute is text color, there is no problem to encode data represented in the decimal base insofar as there are more than 10 colors to represent the decimal figures 0, 1 . . . 9.

Assuming that a different attribute is selected wherein there are less than 10 possible choices, such an attribute would not be useful for the data to be embedded in the decimal base. Even in such a case, it would be possible to use such an attribute provided that the data is represented according to a numerical base N lesser than the number of different possible attribute values. Thus, if there are 5 different possible choices for the selected attribute, the data will be represented in the 5-base with figures 0–4. Of course, such a representation of the data requires to reserve more spaces in the text document for encoding information than by using, for instance, a decimal base.

Another possibility to use an attribute allowed to take only a few number of different values is to combine it with another attribute. As an example, the above attribute taking 5 values could be combined with another attribute, such as italic/non italic, having two possible choices, to represent the 10 figures (0 to 9) of the data encoded in the decimal base.

For example, the following correspondence or mapping table associates a pair of attributes, for instance the color attribute and the italic/non-italic attribute, to hexadecimal digits:

| ENCODED VALUE | COLOR ATTRIBUTE | ITALIC ATTRIBUTE |
|---|---|---|
| 0 | CYAN | NO |
| 1 | DARK CYAN | NO |
| 2 | RED | NO |
| 3 | DARK RED | NO |

-continued

| ENCODED VALUE | COLOR ATTRIBUTE | ITALIC ATTRIBUTE |
| --- | --- | --- |
| 4 | YELLOW | NO |
| 5 | DARK YELLOW | NO |
| 6 | GREEN | NO |
| 7 | DARK GREEN | NO |
| 8 | CYAN | YES |
| 9 | DARK CYAN | YES |
| A | RED | YES |
| B | DARK RED | YES |
| C | YELLOW | YES |
| D | DARK YELLOW | YES |
| E | GREEN | YES |
| F | DARK GREEN | YES |
| NONE | BLACK | Don't care |

Figure 1B:
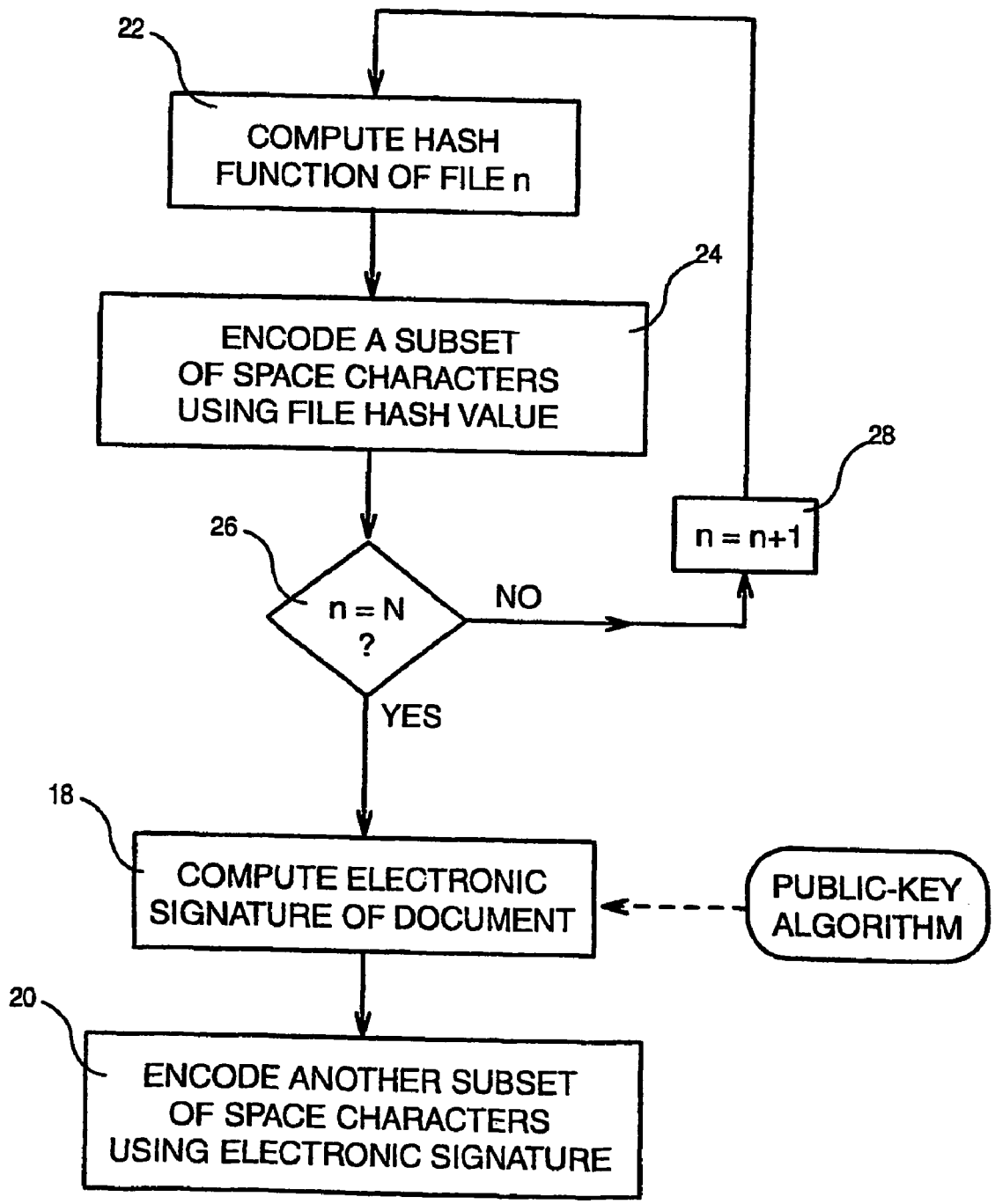
FIG. 1B is a flow chart representing an alternative of the method illustrated in FIG. 1A.
Figure 2B:
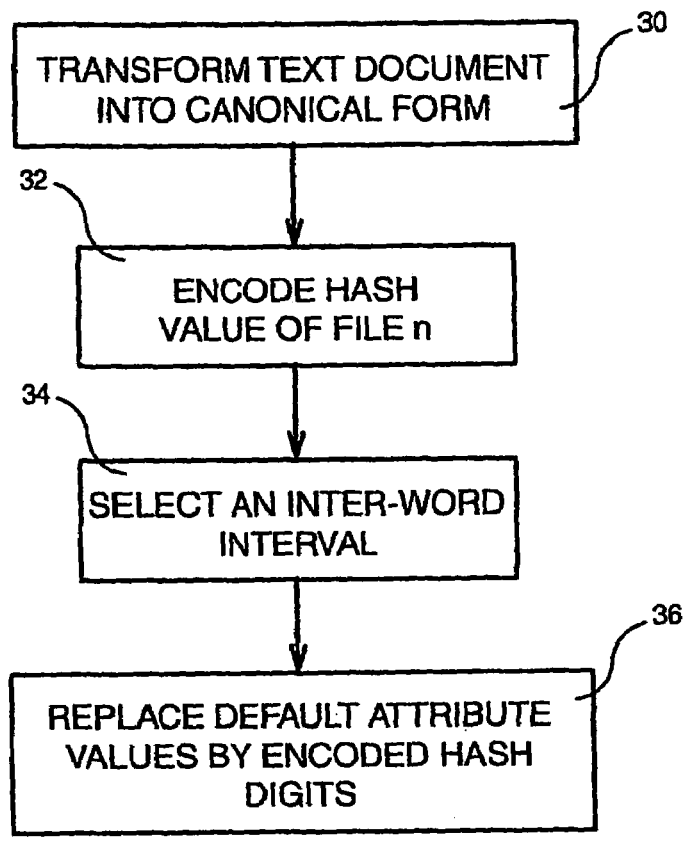
FIG. 2B is a flow chart representing the different steps used in the step of encoding a subset of space characters within the method illustrated in FIG. 1B.

If the alternative method illustrated in FIG. 1B is used, the encoding step represented in FIG. 2B includes the same substeps. Indeed, after the text document has been transformed into canonical form as previously (step 30), the encoding step consists, as previously, in encoding the hash value of file n (step 32), selecting an inter-word interval in the text document different from the intervals already used (step 34) and replacing the default attribute values of space characters of the selected interval by the encoded hash digits.

Figure 3:
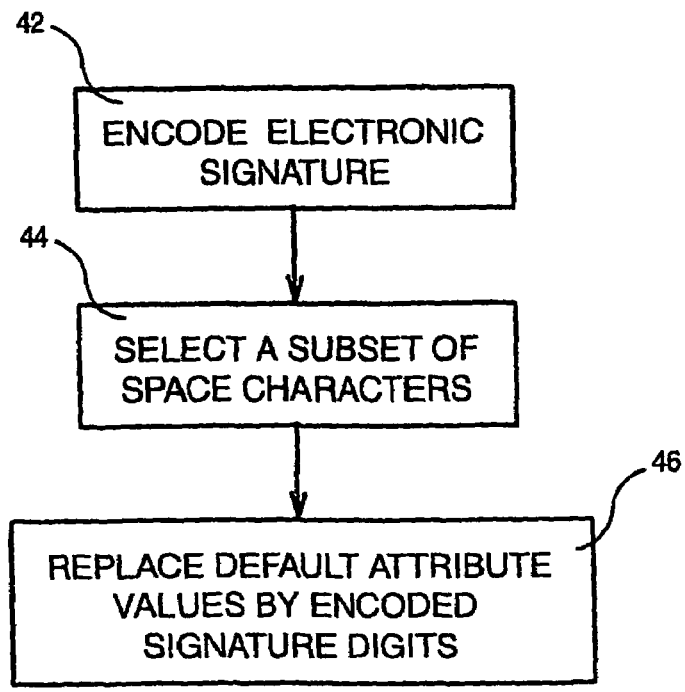
FIG. 3 is a flow chart representing the different steps used in the step of encoding another substet of space characters using the electronic signature within the method illustrated in FIGS. 1A and 1B.

Whatever the method being used, the step of encoding another subset of space characters using the electronic signature illustrated in FIG. 3, consists in encoding the electronic signature by using the set of attribute values in the above table to obtain an ordered sequence of attribute values (step 42), selecting a subset of space characters in the document different from the interval already used for encoding the files (step 44) and replacing the default attribute values of this subset of space characters by the encoded signature digits (step 46).

Figure 4:
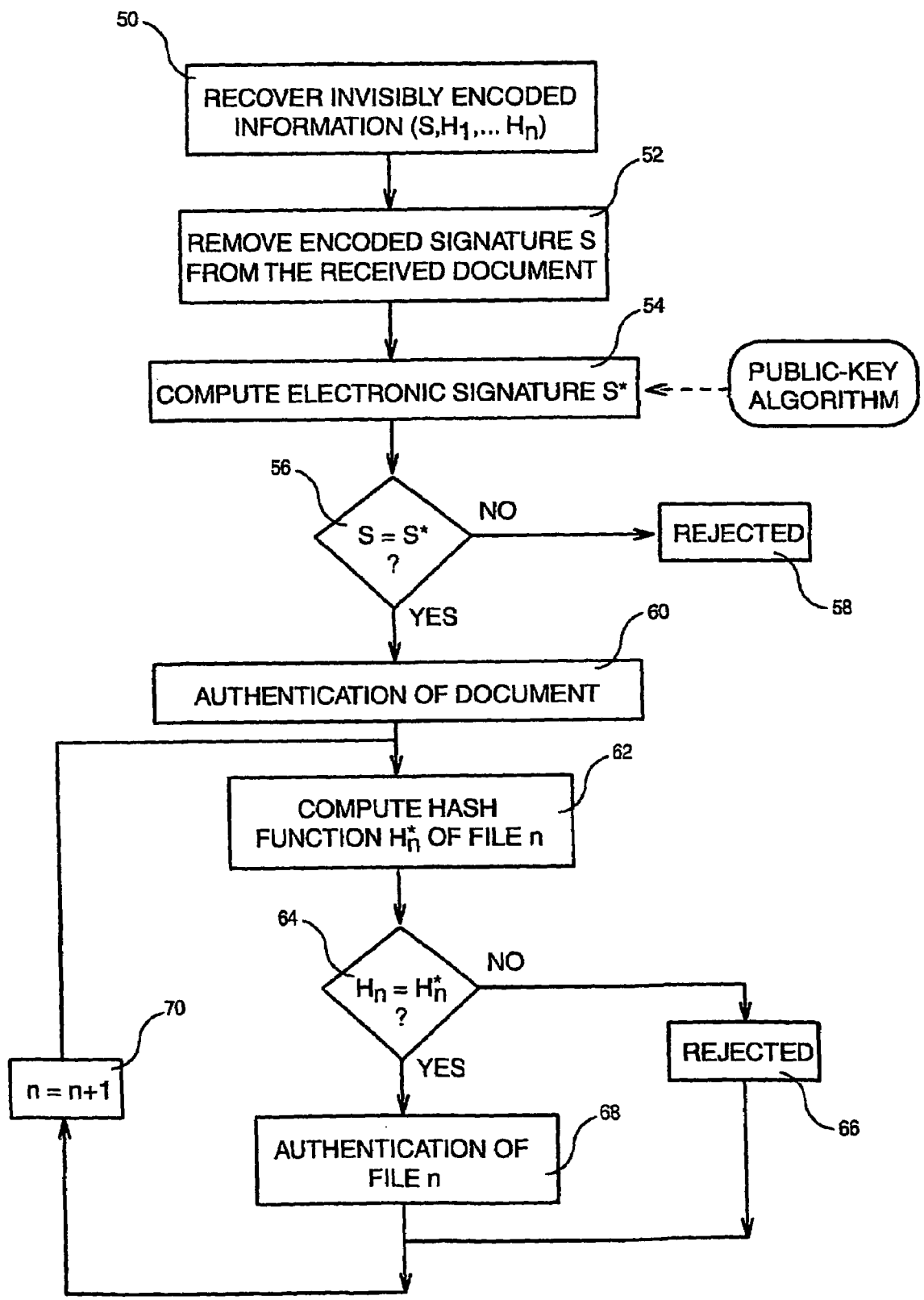
FIG. 4 is a flow chart representing the method for making the authentication of a text document which has been processed according to the method illustrated in FIGS. 1A and 1B.

Now, assuming that the encoded document with the linked files is received by e-mail, the method of authentication illustrated in FIG. 4 is the following. First, the invisibly encoded information is recovered from the received document (step 50) by decoding the encoded attributes in the inter-word intervals which have been used for encoding. Note that the encoded space characters are different from the not encoded space characters the attributes of which have been set to the same default value. Thus, a value S is recovered for the electronic signature and values $H_1 \ldots H_N$ are recovered for the hash values of the N files.

The encoded digits of the recovered value S are then removed from the document (step 52). Thus, the new document always includes the invisibly encoded values $H_1 \ldots H_N$, but appears identical to the received document whereas the two documents are different.

Using the new document from which the encoded electronic signature has been removed, an electronic signature S* is computed (step 54) by means of the same public-key algorithm. Then, a test is made to check whether the values S and S* are identical (step 56). If not, the document is rejected (step 58). If so, there is authentication of the received document (step 60).

Then, by means of the same one-way hash function (e.g. MD5) used by the encoding program when the document was sent, the verification program computes the hash values $H_1^*, H_2^*, \ldots H_N^*$ of the linked files (step 62). A test is then made to check whether the recovered hash value Hn and the computed hash value Hn* are identical for each file n, n being 1 to N (step 64). If not, the received file must be rejected (step 66). If so, this means that there is authentication of file n (step 68). Finally, n is incremented by one (step 70) until all files have been checked.

The above authentication method being protocol and data format independent can be applied to many different software packages such as e-mail systems that generate textual documents that contain links to all types of files. Also, a Web page such as an HTML document that contains hyperlinks to other web pages can be authenticated and the integrity of said hyperlinks be checked by using this method.

It must be noted that, in any case, communication systems exchanging text documents in electronic form (soft copy) must be compatible for using the invention. It is so for almost all modern office and e-mail products. It is also important to note that, even if a system does not support colors (but only black and white texts), it would be even possible to encode invisible information on the blanks of a plain text by using for encoding one or a combination of several different possible attributes, like the font type, italic, bold or protected attributes.

The invention claimed is:

1. A method of authenticating a text document with links to a plurality of files by modifying at least a selected attribute of invisible characters on a plurality of inter-word intervals of the text document, comprising:
 a) computing a one-way hash function of each file of the plurality of files to obtain a hash value composed of a subset of hash digits for each file,
 b) encoding each subset of a plurality of subsets of space characters in the text document by replacing in each subset of space characters, the value of the selected attribute for each space character by a corresponding encoded hash digit of each subset of hash digits corresponding to each one of the plurality of files,
 c) computing an electronic signature of the encoded text document by using a public-key algorithm composed of a subset of signature digits, and
 d) encoding another subset of space characters in the encoded text document by replacing the value of the selected attribute for each space character by a corresponding encoded signature digit.

2. The method according to claim 1, wherein encoding each subset of a plurality of subsets of space characters in the text document comprises:
 transforming the text document into canonical form by setting on all inter-word intervals of the document the value of the selected attribute to the same default value, and for each file:
 encoding the hash digits of the hash value corresponding to the file as an ordered subset of values corresponding to the different values of the selected attribute,
 selecting a plurality of inter-word intervals among all inter-word intervals of the text document corresponding to a subset of space characters to be used for embedding the hash value into the text document, and
 replacing on each space character of the subset of space characters, the default attribute value of this space character by the corresponding encoded hash digit.

3. The method according to claim 2, wherein encoding another subset of space characters comprises:
 encoding the signature digits as an ordered subset of values corresponding to the different values of the selected attribute,
 selecting the another subset of space characters as being a subset of inter-word intervals different from any one of the plurality of inter-word intervals, and replacing on each space character of the another subset of space characters the default attribute value of the space character by the corresponding encoded signature digit.

4. The method according to claim 2, wherein said step of encoding the hash digits comprises encoding the hash digits using a set of attribute values which are encoded by establishing a correspondence table between the attribute values and the digits.

5. The method according to claim 4, wherein the digits to be encoded are a sequence of figures which can be each one of figures 0, 1, 2, . . . , N−1 in the N base the figures corresponding respectively to N selected attribute values.

6. The method according to claim 5, wherein the selected attribute is the character color, the attribute values corresponding to N different colors which can be selected for the color attribute.

7. The method according to claim 6, wherein the digits to be encoded are represented by decimal figures in the decimal base (N=10), each figure 0 to 9 being associated respectively to a color defined by the character color attribute.

8. The method according to claim 5, wherein two attributes are used in combination so that each of the figures 0, 1, 2, . . . N−1 in the N base corresponds respectively to a combination of a selected value of a first attribute and a selected value of a second attribute.

9. The method according to claim 8, wherein the second attribute is the "italic" format of a character, the attribute value corresponding to "italic" or "non italic".

10. The method according to claim 1, wherein the document is a document sent by e-mail over the Internet network.

11. A method of authenticating a text document with links to a plurality of N files received by a communication system wherein the text document includes invisible authentication data which have been incorporated in the document by modifying selected invisible attributes on the space characters, comprising:

transforming the text document into canonical form by setting on all inter-word intervals of the received document the values of the selected attributes to a same default value, recovering invisibly encoded data composed of an origin electronic signature and a plurality N of origin hash values corresponding to the files, the invisibly encoded data corresponding to predefined subsets of space characters wherein the values of the selected attribute are different from the same default value, removing the recovered value of the electronic signature from the received document to obtain a new document, computing a new electronic signature from the new document by using the same public-key algorithm being used when the document has been encoded, comparing the new electronic signature to the origin electronic signature, and if the new electronic signature is identical to the origin electronic signature, computing a one-way hash function of each of the files in order to obtain a new hash value for each one, and comparing the new hash value to an origin hash value for each file n of the N files with n being 1 to N in order to authenticate a file n.

12. A system for authenticating a text document with links to a plurality of files by modifying at least a selected attribute of invisible characters on a plurality of inter-word intervals of the text document, comprising:

means for computing a one-way hash function of each file of said the plurality of files to obtain a hash value composed of a subset of hash digits for each file;

means for encoding each subset of a plurality of subsets of space characters in the text document by replacing in each subset of space characters, the value of the selected attribute for each space character by a corresponding encoded hash digit of each subset of hash digits corresponding to each one of the plurality of files;

means for computing an electronic signature of the encoded text document by using a public-key algorithm composed of a subset of signature digits; and means for encoding another subset of space characters in the encoded text document by replacing the value of the selected attribute for each space character by a corresponding encoded signature digit.

13. A system for authenticating a text document with links to a plurality of N files received by a communication system wherein the text document includes invisible authentication data which have been incorporated in the document by modifying selected invisible attributes on the space characters, comprising:

means for transforming the text document into canonical form by setting on all inter-word intervals of the received document the values of the selected attributes to a same default value;

means for recovering invisibly encoded data composed of an origin electronic signature and a plurality N of origin hash values corresponding to the files, the invisibly encoded data corresponding to predefined subsets of space characters wherein the values of the selected attribute are different from the same default value, means for removing the recovered value of the electronic signature from the received document to obtain a new document;

means for computing a new electronic signature from the new document by using the same public-key algorithm being used when the document has been encoded;

means for comparing the new electronic signature to the origin electronic signature, and if the new electronic signature is identical to the origin electronic signature, computing a one-way hash function of each of the files in order to obtain a new hash value for each one; and means for comparing the new hash value to an origin hash value for each file n of the N files with n being 1 to N in order to authenticate a file n.

14. A computer program product for authenticating a text document with links to a plurality of files by modifying at least a selected attribute of invisible characters on a plurality of inter-word intervals of the text document, comprising:

a computer readable medium having computer readable program code embodied therein, the computer readable program code comprising:

computer readable program code configured to compute a one-way hash function of each file of said the plurality of files to obtain a hash value composed of a subset of hash digits for each file;

computer readable program code configured to encode each subset of a plurality of subsets of space characters in the text document by replacing in each subset of space characters, the value of the selected attribute for each space character by a corresponding encoded hash digit of each subset of hash digits corresponding to each one of the plurality of files;

computer readable program code configured to compute an electronic signature of the encoded text document by using a public-key algorithm composed of a subset of signature digits; and computer readable program code configured to encode another subset of space characters in the encoded text document by replacing the value of the selected attribute for each space character by a corresponding encoded signature digit.

15. A computer program product for authenticating a text document with links to a plurality of N files received by a communication system wherein the text document includes invisible authentication data which have been incorporated in the document by modifying selected invisible attributes on the space characters, comprising:

a computer readable medium having computer readable program code embodied therein, the computer readable program code comprising:

computer readable program code configured to transform the text document into canonical form by setting on all inter-word intervals of the received document the values of the selected attributes to a same default value;

computer readable program code configured to recover invisibly encoded data composed of an origin electronic signature and a plurality N of origin hash values corresponding to the files, the invisibly encoded data corresponding to predefined subsets of space characters wherein the values of the selected attribute are different from the same default value;

computer readable program code configured to remove the recovered value of the electronic signature from the received document to obtain a new document;

computer readable program code configured to compute a new electronic signature from the new document by using the same public-key algorithm being used when the document has been encoded;

computer readable program code configured to compare the new electronic signature to the origin electronic signature, and if the new electronic signature is identical to the origin electronic signature, compute a one-way hash function of each of the files in order to obtain a new hash value for each one; and computer readable program code configured to compare the new hash value to an origin hash value for each file n of the N files with n being 1 to N in order to authenticate a file n.

* * * * *